Figure 1:
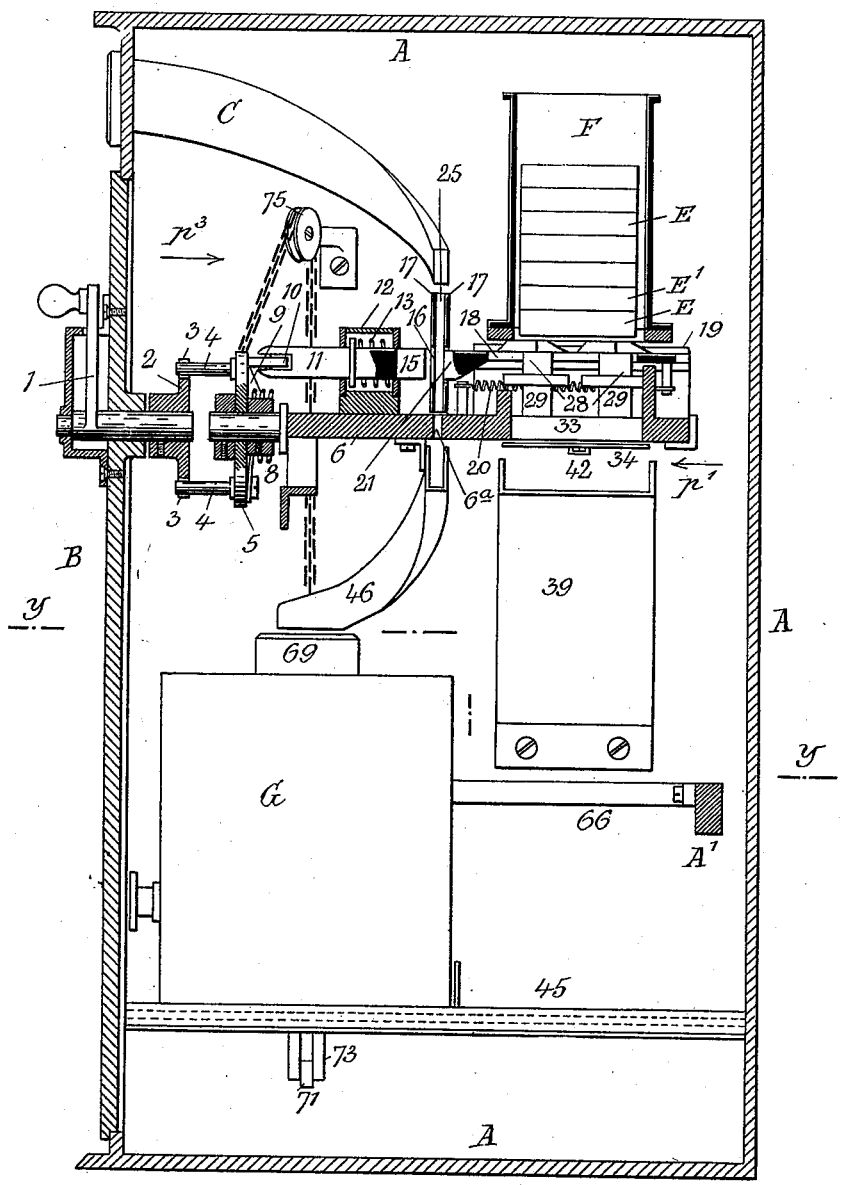

(No Model.) 5 Sheets—Sheet 1.
H. PETSCH & H. SOUKUP.
AUTOMATIC ADVERTISER.

No. 593,754. Patented Nov. 16, 1897.

Witnesses:

Inventors:
Hans Petsch
Hugo Soukup
By ____ their Attorneys.

(No Model.)  H. PETSCH & H. SOUKUP.  5 Sheets—Sheet 2.
AUTOMATIC ADVERTISER.

No. 593,754.  Patented Nov. 16, 1897.

Witnesses.  Inventors.
Hans Petsch
Hugo Soukup
By
their Attorneys.

(No Model.) 5 Sheets—Sheet 3.
H. PETSCH & H. SOUKUP.
AUTOMATIC ADVERTISER.
No. 593,754. Patented Nov. 16, 1897.
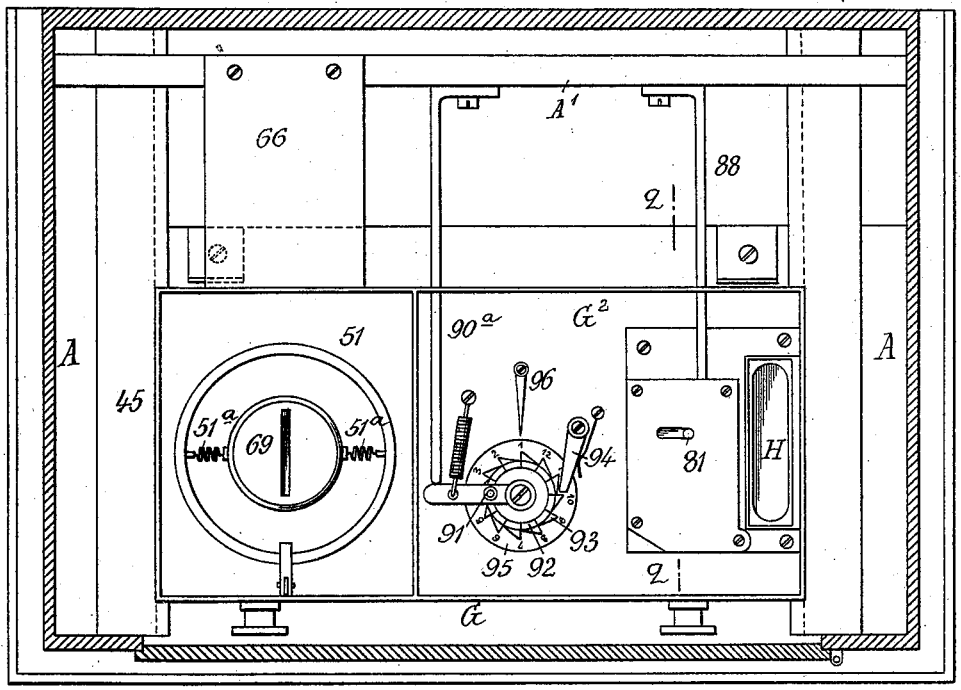
*Fig. 3.*
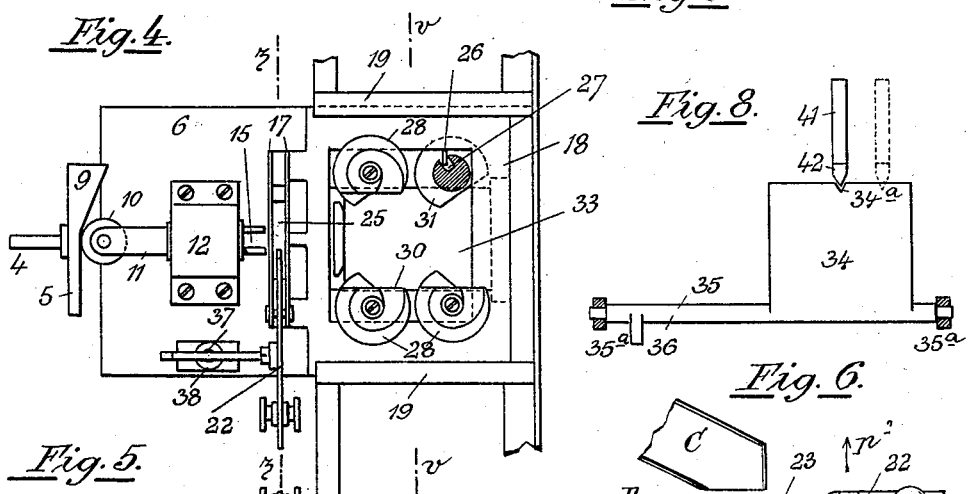
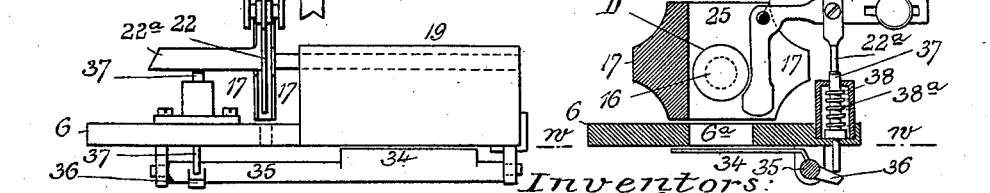
Witnesses: Inventors:
Hans Petsch
Hugo Soukup
By their Attorneys (No Model.) 5 Sheets—Sheet 4.
H. PETSCH & H. SOUKUP.
AUTOMATIC ADVERTISER.
No. 593,754. Patented Nov. 16, 1897.
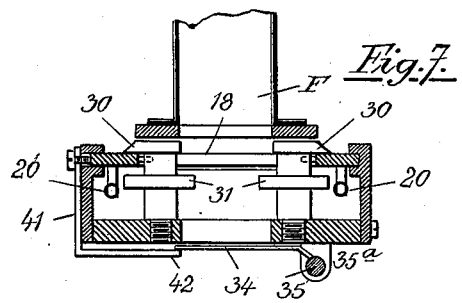
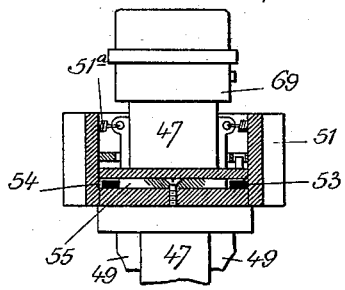
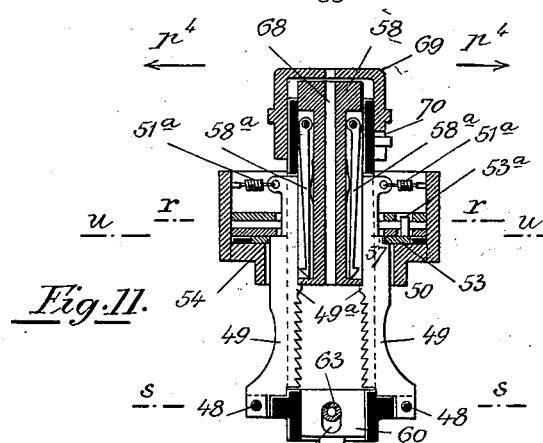
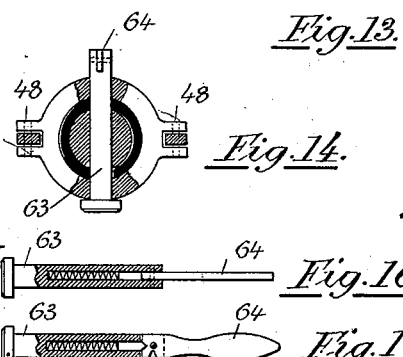
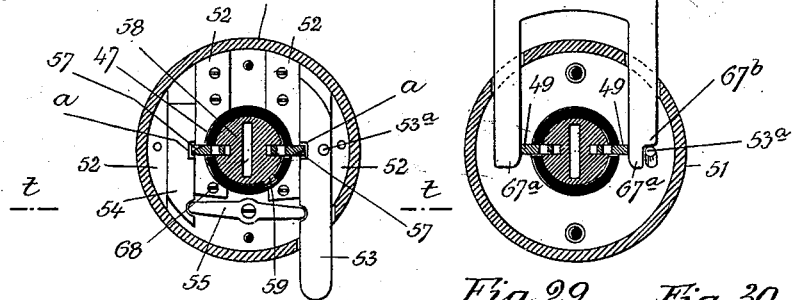
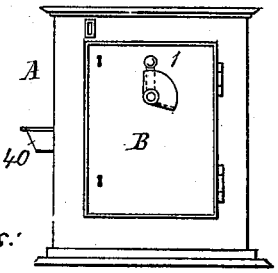
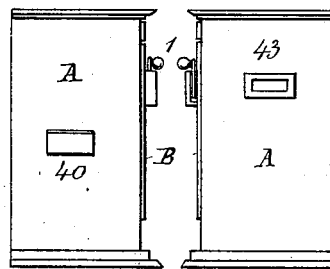
Witnesses: Inventors.
Hans Petsch
Hugo Soukup
By their Attorneys
THE NORRIS PETERS CO., PHOTO-LITHO., WASHINGTON, D. C.

(No Model.)
H. PETSCH & H. SOUKUP.
AUTOMATIC ADVERTISER.
No. 593,754.
Patented Nov. 16, 1897.
5 Sheets—Sheet 5.
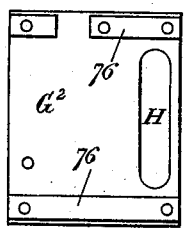
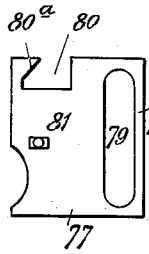
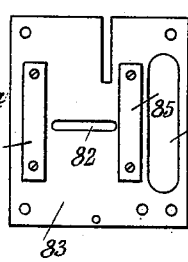
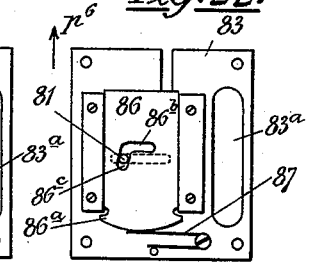
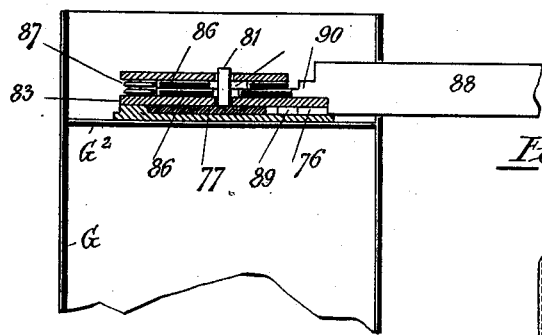
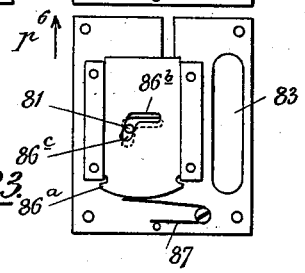
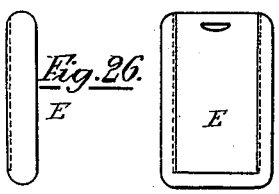
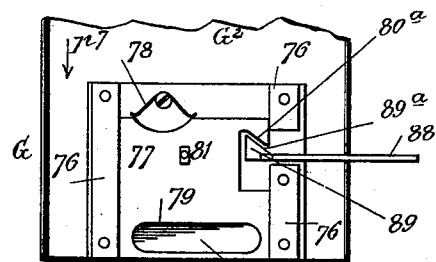
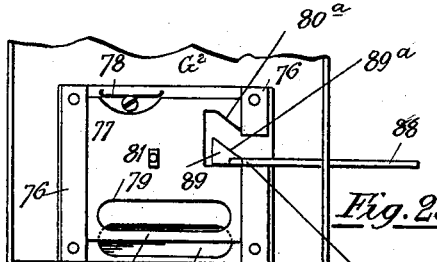
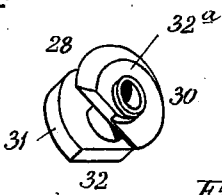
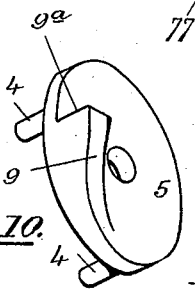
Witnesses:
E. B. Bolton
Ott Munk
Inventors:
Hans Petsch
Hugo Soukup
By
their Attorneys.

UNITED STATES PATENT OFFICE.

HANS PETSCH AND HUGO SOUKUP, OF VIENNA, AUSTRIA-HUNGARY.

AUTOMATIC ADVERTISER.

SPECIFICATION forming part of Letters Patent No. 593,754, dated November 16, 1897.

Application filed July 29, 1896. Serial No. 600,903. (No model.)

*To all whom it may concern:*

Be it known that we, HANS PETSCH and HUGO SOUKUP, citizens of Austria, and residents of Vienna, Austria-Hungary, have invented certain new and useful Improvements in Automatic Advertisers, of which the following is a specification.

Our invention relates to an automatic machine which, owing to its peculiar construction, allows of the reception of advertisements, while at the same time the amounts paid by the different advertisers are duly controlled.

This machine, which is preferably erected within a kiosk or the like, has for its object to allow any one who has such a machine in his neighborhood to file or drop into said machine an announcement or advertisement without having to go to the office of the newspaper wherein he wishes the advertisement or announcement to be inserted, while at the same time receiving an acknowledgment or receipt.

The machine is erected within a kiosk, in the wall of which an opening is made where the requisite amount of money is placed in order that by pressing on the knob a box, capsule, book, or the like may be obtained which is duly numbered and drops from a second opening. In this box or capsule there may be placed a ticket which bears the same number as the box and acknowledges that the ticket has been obtained by inserting the proper amount in the machine. In this box or the like the advertisement is now placed which it is desired to insert as well as any additional amount which may have to be paid into the machine owing to the desired advertisement costing more than the sum already paid into the machine. The box being now closed is pushed through a third opening, whereupon it falls into a collecting-chamber. The money dropped through the first opening falls into a money-collecting box which is constructed in such a manner that the money is placed in exactly the same order as it was dropped into the machine through the first-mentioned opening, so as to correspond to the number of the box, thus providing controlling means whereby it can be ascertained that for any given box the right amount has been paid and that no lesser sum or no base coin has been fraudulently placed in this collecting-box. For this purpose the money-collecting box is so constructed that the coin must lie horizontally and that the box cannot be opened by the person appointed to collect the advertisements, but can only be opened at the office, while the number of collections made by the said person is duly registered.

In the annexed drawings there is shown a form of construction of this apparatus.

Figure 2:
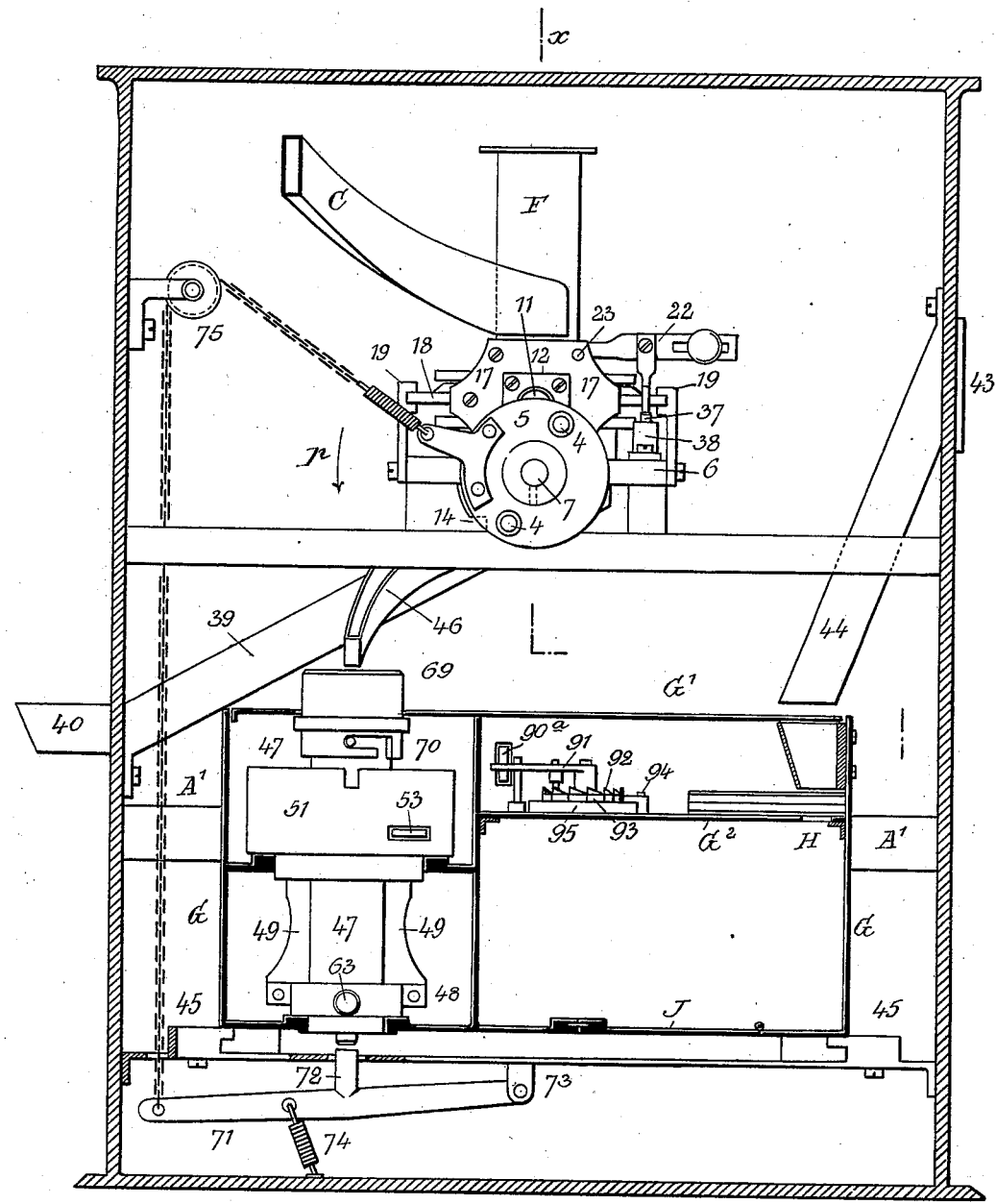

Figure 1 is a longitudinal section on line X X of Fig. 2. Fig. 2 is an end view, partly in section; and Fig. 3 a horizontal cross-section on line $y\ y$ of Fig. 1. Fig. 4 is a plan view of the carriage belonging to the device for delivering the box or the like. Fig. 5 is a side view of this carriage. Fig. 6 is a section on line $z\ z$ of Fig. 4. Fig. 7 is a section on line $v\ v$ of Fig. 4 through this carriage. Fig. 8 is a section on line $w\ w$ of Fig. 6. Figs. 9 and 10 show detached parts in perspective view. Fig. 11 is a longitudinal section through the coin-collecting device. Fig. 12 is a cross-section on line $u\ u$ of Fig. 11. Fig. 13 is a tangential section on line $t\ t$ of Fig. 12. Fig. 14 is a cross-section on line $s\ s$ of Fig. 11. Fig. 15 is a cross-section on line $r\ r$ through the coin-collecting device, Fig. 11. Figs. $15^a$, 16, and 17 show details of construction of the coin-collecting device. Fig. 18 is a section on line $q\ q$ of Fig. 3 through the mechanism for receiving the cases. Figs. 19, 20, 21, 22, and 23 are details of the last-named device. Figs. 24 and 25 show the mechanism for receiving the cases, &c., in two different positions. Figs. 26 and 27 show an object in the form of a box for receiving the advertisement. Figs. 28, 29, and 30 show the whole apparatus on a smaller scale in exterior view—front view and two side views.

The whole apparatus is arranged in a case A, Figs. 1 to 3 and 28 to 30, in the door B of which a crank 1 is mounted, which on the inner side of the door is provided with a disk 2. When the door is closed, pins 4 extend into recesses 3 in the disk 2, which pins are carried by a second disk 5, Figs. 1 and 10, this arrangement forming a detachable coupling between the crank 1 and the rest of the apparatus for allowing of the opening and closing of the door B.

The disk 5 is mounted on a gudgeon 7 on a plate 6, fixed in the case A, and stands under the effect of a spring 8, which tends to turn the disk in the direction of arrow $p$, Fig. 6. The back of the disk 5 is provided with an inclined plane or cam 9, against which lies the roller 10 of a pin 11, which is guided in a casing 12 and pressed by a spring 13 with its roller 10 always against the cam 9. The end $9^a$, Fig. 10, of the cam 9 pushes against the fixed projection 14 of the plate 6, which thus limits the revolution of the disk 5 under the impulse of the spring 8 in this direction.

The pin 11 is provided at the back with a cross-cut 15, and when pressed back extends through corresponding openings 16 16 in the two plates 17 17. These two plates 17 are fixed on a carriage 18, which is movable in guides 19, and is pulled by means of springs 20 always forward in the direction of arrow $p'$, Fig. 1. On the carriage 18 is a projection 21, which fits into the slot 15. It is now evident that if the crank 1 is turned in the direction of the hands of a clock the pin 11 is pressed backward and the end with the cross-cut 15 slides into the openings 16 of the plates 17, and the projection 21 engages in the cut 15 without the carriage 18 being moved. However, if a coin D has been thrown through the chute C it falls between the two plates 17 17 and remains before the openings 16 16, therefore covering the same. In order that the coin be kept in this position, there is arranged between the two plates 17 17 an angular lever 22, turning around the pin 23, Fig. 6, which lever is widened at 24 to reduce the width of the coin-channel 25, so that the coin D cannot fall through until the lever 22 is moved in the direction of the arrow $p^2$, so that the part 24 no longer obstructs the coin-channel 25. When in the described manner a coin is in the coin-channel 25 and the crank 1 is turned in the beforesaid direction, the pin 11 pushes against the coin D in the channel 25 and the coin against the projection 21, forcing the carriage 18 to move backward in the direction of the arrow $p^3$, Fig. 11.

On the carriage 18 are fixed pins 26, Fig. 4, which reach into hollows 27 of the rollers 28 and give to the carriage a partial revolution in the direction as soon as the carriage begins to move. These rollers 28, Fig. 9, rotate on pins 29 on the bed-plate 6 and carry two disks 30 and 31, Figs. 4, 7, and 9. The upper disk 30, Fig. 9, is beveled to a conical shape and a segment of the circle is removed. The edge 32 is then sharpened and the upper surface runs helicoidally back to the flat part $32^a$. The under disk 31 is simply cylindrical and flattened equally at one side. The two flattenings, however, do not stand parallel with one another, but lie at about an angle of thirty degrees, as shown in Figs. 4 and 9. Usually—that is, when the carriage 18 is stationary—the position of the rollers 28 is such that the disks 31 project over the opening 33 of the bed-plate 6. Then the lower of the objects (cases, &c.) E, which are conveniently placed over the rollers 28 in a guide F, lies upon the disks 31, Figs. 1 and 4. When, however, the carriage 18 is moved in the already-indicated manner, the disks 31 pass off and free the opening 33 and the lower object E can freely fall through. Simultaneously the sharpened edges 32 of the upper disks 30 have passed under the next following object E', Fig. 1, and prevented the same from falling after and upon the first object E. When the carriage returns to its stationary position, the rollers 28 simultaneously retake their normal position and the next object E' descends and lies upon the disks 30. The object E freed by the disks 31 falls upon a plate 34, which turns on an axle 35 in the bearings $35^a$. This axle 35 carries a projection 36, Fig. 6, which lies against a pin 37, which is guided in a casing 38 and is pressed downward by a spring $38^a$. The plate 34 is thus kept in position and also the before-mentioned lever 22, which carries a bar $22^a$, lying against the end of the pin 37. As soon as an object E, freed by the disks 31, falls upon the plate 34 the latter is pressed downward in consequence of the weight of the object E, and the object E falls freely into the chute 39 and can be taken out at the mouth 40, Figs. 1 and 28. At the moment when the plate 34 descends the projection must necessarily lift the pin 37 by the revolution of the axle 35 and also move the angular lever 22 upward in the direction of the arrow $p^2$. As already described, the chute 25 thus becomes free, and the coin D can also fall freely from the chute 25 through the opening $6^a$ of the plate 6. In order that the object E may fall out only at the moment when the carriage 18 retakes its stationary position, there is fixed on the carriage 18 itself a tongue 41, Fig. 7, which reaches with the point 42 under the free edge of the plate 34. In this latter plate 34 is provided a slot $34^a$, Fig. 8. As soon as the carriage 18 takes its stationary position the point 42 of the tongue 41 is exactly over the slot $34^a$, and the plate can then swing downward unhindered. When, however, the carriage 18 is moved backward, the said tongue 41 prevents the plate 34 from downward movement, and thus the object E falling upon the plate 34 is not delivered until the carriage 18 has again taken its stationary position and the object lies exactly over the chute 39.

The advertisement required is placed in the object delivered by the apparatus, and this object, provided with the advertisement, is thrown into the opening 43, whereupon it falls through the chute 44 into a box G, which has been slid on the guides 45 45 into the casing A and can be pulled out again. In this case G is also inserted the coin-collecting device, into which the coins fall, passing through the opening $6^a$ and the chute 46. The arrangement and the construction of this collecting device are essentially as follows, Figs. 11 to 17:

In a slotted tube 47, which has an inner width a little larger than the diameter of the coin to be used, there are arranged toothed rods 49, which lie diametrically opposite each other and on pins 48. They extend through corresponding longitudinal slots in the tube 47. On the tube 47 is fixed a basket 51 by means of the bottom plate 50, and two spiral springs 51$^a$, connected with the basket 51, and the toothed rods 49 respectively tend to pull the toothed rods always outward. This movement is limited by two slides 53 54, which move in the guides 52 of the basket 50 51 and are connected by a balance-lever 55. On moving the slide 53 by hand in one direction the slide 54 moves in the other direction and the toothed rods 49 are moved inward in consequence of the sliding of the edges 56 over the beveled edges 57 of the toothed rods 49—that is to say, the projections 49$^a$ project into the interior of tube 47, Fig. 11. In this position the projections 49$^a$ serve as supports to a cylinder 58 to be slid into the tube 47. This cylinder is provided with two dogs 58$^a$, reaching eventually into the teeth of the toothed rods 49, and in order that the bolts lie always exactly opposite the toothed rods 49 this cylinder is secured against turning in the tube 47 in the known manner by means of feather and groove 59. In the under part the tube 47 is closed by a piston 60 with pin 61, and this piston has a longitudinal slot 62, into which reaches a bolt 63, which reaches through the under end of the tube 47. This bolt is provided on one end with a spring-operated tilting lever 64 of known construction, Figs. 16 and 17. In the basket 51 are a little above the slides 53 54 two openings 65 65, and the whole hitherto-described device is inserted into two corresponding bearing-places of the case G, Fig. 2. When the box G is then slid into the guides 45, a fork 66, fixed on the rail A' of the casing of the apparatus, penetrates with the two arms 67 into the openings 65 65 and presses with the ends 67$^a$ the toothed rod 49 inward, Fig. 15. Simultaneously the projection 67$^b$ has operated a pin 53$^a$, provided on the slide 53 in such a manner that the slide 53, previously moved in by hand, and also the slide 54 are moved automatically in the opposite direction. The edges 56 thus free the toothed rods 49 and these would recede unhindered into the hollows $a$ of the slides 53 54 in consequence of the springs 51$^a$, if they were not kept by the fork-arms 67 67. Over the upper end of the tube 47 and the cylinder 58, which is provided with a flat passage 68 for the coins, is slid a closing-cover 69 by means of a bayonet-closure 70. When a coin falls in the described manner through the chute 46 into the coin-entrance 68, it falls finally into the interior of the tube 47 and upon the piston 60. If by chance it did not take a flat position, this is insured by the arrangement under the pin 61 of a second pin 72, Fig. 2, on the lever 71. This lever 71 turns in the bearings 73 of the bottom of the apparatus, stands under the effect of a spring 74, and is connected with the disk 5 by means of a string or chain which runs over the roller 75. When the disk 5 is turned, as already described, the lever 71 with the pin 72 lifts the piston 60. When the crank 1 is left free, the lever 71 moves back and the piston 60 sinks again. This shaking movement secures in any case the flat position of the coins falling into the tube 47. To take the coins out of this coin-collecting apparatus one must necessarily first pull the case G out of the guides 45. When this is effected, the arms 67 of the fork 66 free the toothed rods 49 and these recede then unhindered into the hollows $a$ of the slides 53 54, as these, as already described, were already brought into the corresponding position when the case was slid in. By means of the back movement of the toothed rods 49 the projections 49$^a$ free the cylinder 58, and the latter sinks unhindered upon the coin-pile lying upon the piston 60. The coins can then only be taken out by taking the piston 60 out and by pulling the tilting bolt out, as the cylinder 58 can also be taken out only downwardly from the tube 47, as movement is prevented in the opposite direction by the dogs 58$^a$ engaging now with the toothed rods 49.

The whole coin-collecting device is, as already described, inserted into the case G. As the latter is closed by a cover G' with a corresponding lock the person who pulls the case A out cannot take the coins out unless he have the key for the cover G', as even by opening the bayonet-closure 70 he cannot remove the cylinder 58 and thus take out the coins. The objects E thrown in through the chute 44 fall then also into the case G through the opening H. In order that also no object can be taken out through this opening H, when the case G is pulled out of the guides 45, (the objects being removable only by opening the little door J,) the following arrangement is made, Figs. 18 to 25: Upon the middle plate G$^2$ of the case G are fixed guides 76, Fig. 19, in which a plate 77, Fig. 20, moves. A spring 78, Fig. 24, tends to press this plate 77 always forward in the direction of the arrow $p^7$, so that the opening 79 corresponds with the opening H. In the plate 77 is further provided a slot 80 and a pin 81. Over the plate 77 and the guides 76 is screwed a plate 83, Fig. 21, which has also an opening 83$^a$, which corresponds again with the opening H. The pin 81 extends through a long slot 82 of the plate 83, and the slide 77 is not hindered in its movement. Upon the plate 83 are screwed guides 85, in which one, two, or more tumbler-plates 86, Fig. 22, are movably arranged. The springs 87 tend to move these tumblers 86 always in the direction of the arrow $p^6$, and the projections 86$^a$ limit the movement of the plates 86 in the direction of the spring-pressure. The pin 81 reaches into angular slots 86$^c$ of the tumbler-plates. This whole device is closed with a cover-plate, which has also a hollow corresponding with the opening H. As long as the tumbler-plates 86 take the position of Fig. 22—that is, when they are alone under the effect of the springs 87—also the pin 81 is in the angular part 86$^c$ of the plates 86. In this position the slide 77 occupies such a position that the closing-bridge 77$^a$ closes partly the opening H, Fig. 25, but this is only effected as soon as the case G is pulled out of the casing of the apparatus. As soon as the case G is, however, slid into the guides 45 a key 88, fixed on the rail A′, penetrates on the one side with its horizontal bit 90 into the described lock, while the part 89 enters into the recess 80, Fig. 25, of the slide 77, and the bit 90 lies opposite the tumbler-plates 86. In order to allow the key to enter, the guide 76 and the plate 77 are of course perforated at the corresponding place. When the key enters in the described manner, the vertical bit 90 first moves the tumbler-plates 86 back in opposite direction to the arrow $p^6$ until the slots 86$^c$ of the tumblers correspond exactly with the pin 81. On this moment the spring 78 operates and presses the slide 77 forward and the openings H and 79 exactly cover one another, and the objects E can fall unhindered into the case G, Fig. 24. As long as the case G is slid into the apparatus the slide 77 remains in this position, but when one pulls the case G out again the horizontal bit 89 with its oblique edge 89$^a$ comes into operation. In the in-slid position of the case G also the oblique guide 80$^a$ of the hollow 80 of the slide 77 lies against the edge 89$^a$, Fig. 24. When the case G is pulled out, the guide 80$^a$ must necessarily escape past the edge 89$^a$, and the slide 77 is thus moved in the opposite direction against the pressure of the spring 78. Thus the point 81 arrives opposite the angular parts 86$^c$ of the slots 86, but as by pulling the case out also the tumbler-plates 86 are freed and can follow the effect of the springs 87 they move with the slots 86$^c$ again over the pin 81 and lock the slide 77 as soon as the bit 89 has left the hollow 80. As shown in Fig. 25, the opening H is thus again barred, and it is then impossible to take out the objects E through this opening H. In order to control also the number of removals of the case G out of the casing of the apparatus, on the rail A′ is also a pin 90$^a$, which pushes against a spring-operated dog 91 and moves the same in the direction of the arrow $p^8$ when the case G is slid into the apparatus. When the case G is removed from the apparatus, the dog 91 moves back and turns the ratchet-wheel 92 for one tooth. With the ratchet-wheel 92 is connected a second ratchet-wheel 93, with which engages a pawl 94, allowing the wheel 92 to turn only in one direction. A counting-disk 95, which is connected with the wheels 92 93, shows with the hand 96 the number of removals of the case G from the apparatus. The control for false money thrown in is very easy, as these coins lie in arithmetical succession in the tube 47; but as also the objects E in the guide F are numbered from below upward in arithmetical succession "1," "2," "3," &c., it will easily be seen for which object a false coin has been thrown in.

Besides the described construction the apparatus may also be constructed in such a manner that it operates only after several coins have been thrown in. There can also be provided arrangements of a known manner (magnets, sieves, &c.,) for preventing false coins from being thrown in. Finally, there may be provided devices of a known kind, which close automatically all the in-throw and delivery openings as soon as the guide F contains no more objects E.

Having now particularly described and ascertained the nature of this invention and in what manner the same is to be performed, we declare that what we claim is—

1. A coin-freed apparatus for receiving advertisements comprising a casing, a coin-freed device within the casing for holding a series of articles adapted to receive the advertisement and to deliver them in exchange for a coin, and a compartment within the casing for receiving the articles after the advertising matter has been placed therein, substantially as described.

2. In combination, the casing, the coin-freed device therein adapted to deliver an article designed to receive advertising matter in exchange for a coin, a removable compartment within the casing designed to receive the articles after the advertising matter has been written thereon and also the coin from the coin-freed apparatus, and means whereby the admission of the articles containing advertising matter is prevented when the removable compartment is removed, substantially as described.

3. In combination, the casing, the magazine for holding articles adapted to receive advertising matter, the carriage for delivering said articles, the coin-chute, the operating-handle designed to be normally disconnected from the carriage, means for causing the coin to connect the operating-handle and delivery-carriage to deliver the article, and a compartment to receive the article after the advertising matter has been placed therein, substantially as described.

4. In combination, the casing, the magazine for the articles designed to receive advertising matter, the carriage for delivering said articles singly, the operating-handle normally disconnected from said carriage, the coin-chute, the lever arranged to retain said coin in a position to operatively connect the handle and carriage, and the second lever adapted to be operated by the weight of the article as it leaves the carriage to restore said first-named lever to normal position, substantially as described.

5. In combination, the casing, the magazine for holding articles designed to receive advertising matter, the coin-controlled operating-handle for effecting the delivery of said articles, the removable compartment for receiving the articles after the advertising matter has been placed therein, the coin-receiving cylinder in said compartment, and means for agitating the coins within said cylinder to cause them to lie flatwise, said agitating means being operated from the operating-handle, substantially as described.

6. In a coin-controlled device for delivering articles designed to receive advertising matter, the combination with the casing, of a removable compartment, a coin-receiving cylinder therein, a second cylinder telescoping in said coin-cylinder and having a slot for the admission of the coin, means for holding said second cylinder in an elevated position and permitting it to drop upon the coins in the coin-receiving cylinder upon the removal of the compartment from the casing, and means carried by said cylinder for automatically locking them together when the upper cylinder is so released, substantially as described.

7. In a coin-controlled device of the character described, the combination with the casing, of the removable compartment, the coin-receiving cylinder therein, the toothed rods pivotally connected therewith under spring tension, the second cylinder telescoping in the coin-cylinder and having hooked arms for engaging the toothed rods when said second cylinder drops therein, the slides for passing the toothed rods inward to prevent the sinking of the second cylinder within the coin-cylinder while it is being put in place, the stationary fork within the casing adapted to engage the toothed rods and hold them pressed inward toward the second cylinder, means whereby the said stationary fork moves the slides from contact with the fork and sets the parts in such a position that upon the removal of the compartment from the casing the second cylinder sinks within the coin-cylinder and is automatically locked therein, substantially as described.

8. In a coin-freed apparatus for delivering articles designed to receive advertising matter, a removable compartment designed to receive back the articles after the advertising matter has been placed therein, a counting-disk, and dog-and-ratchet connections whereby said disk is operated by the removal of the compartment from the casing, substantially as described.

Signed at Vienna, Empire of Austria-Hungary, this 17th day of June, A. D. 1896.

HANS PETSCH.
HUGO SOUKUP.

Witnesses:
HARRY BELMONT,
LEOPOLD WEPERVOGL.